March 14, 1967     J. W. EHLEN     3,308,859
SELF-SHARPENING SAW CHAIN
Filed Jan. 4, 1966
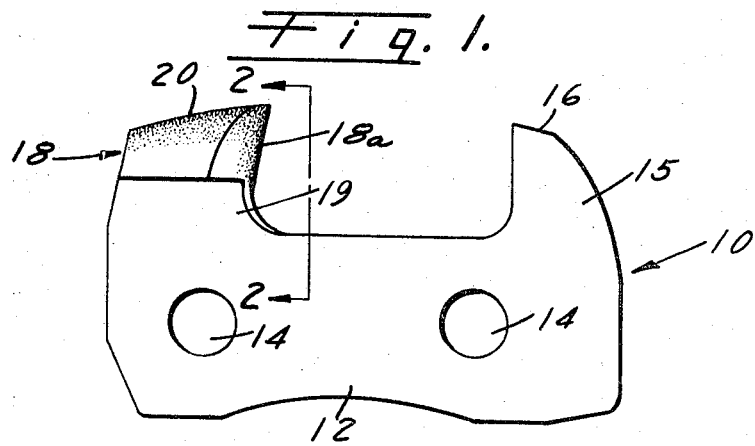
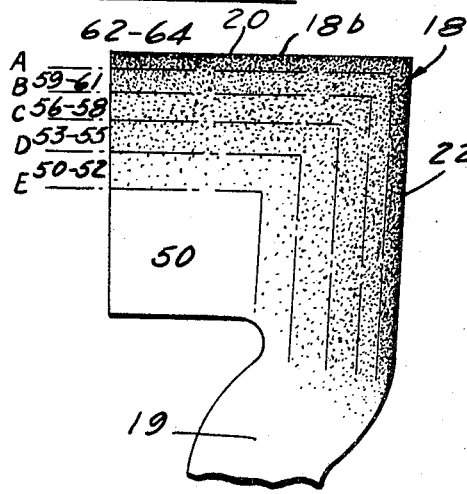
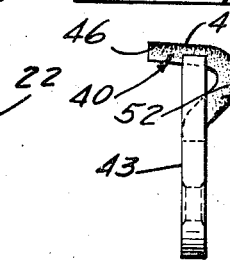
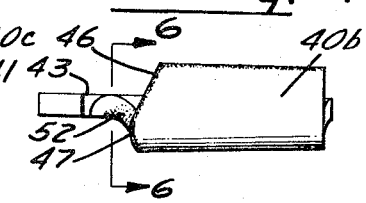
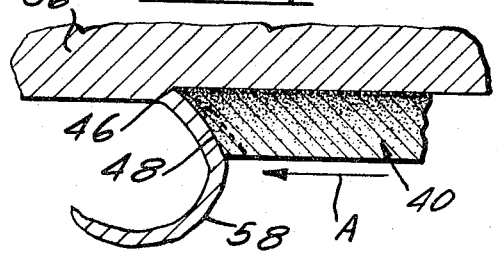
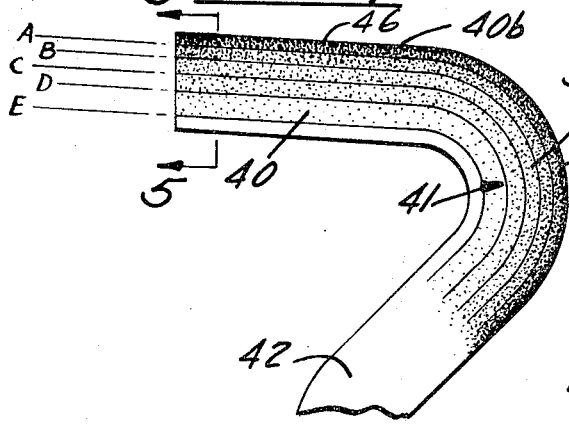
Jack W. Ehlen,
INVENTOR.
WHANN & McMANIGAL
Attorneys for Applicant

United States Patent Office 3,308,859
Patented Mar. 14, 1967

3,308,859
SELF-SHARPENING SAW CHAIN
Jack W. Ehlen, Torrance, Calif., assignor to McCulloch Corporation, Los Angeles, Calif., a corporation of Wisconsin
Filed Jan. 4, 1966, Ser. No. 518,586
5 Claims. (Cl. 143—135)

This invention relates generally to saw chains and relates more particularly to the cutter teeth thereof.

This is a continuation-in-part of my copending application for Self-Sharpening Saw Chain, Ser. No. 268,993, filed Mar. 29, 1963, now abandoned.

While the invention has particular utility in connection with the cutter teeth of saw chains and is shown and described in such connection, it is to be understood that its utility is not confined thereto.

As is well known, the teeth of saw chains rapidly become dull with use and must be frequently sharpened. When sharpened by hand with a file or the like considerable productive time is lost and it is, therefore, an object of the present invention to provide cutting elements or cutter teeth that are self-sharpening so that the chain saw operator may put in a maximum of productive time.

It is another object of the invention to provide self-sharpening cutting elements or cutter teeth for saw chains so that a maximum of productive time may be put in by even the unskilled or untrained operator without the know-how for sharpening the teeth of the chain with a file or the like. Also, the occasional user, who usually does not have the know-how for sharpening the teeth of the saw chain, will have the maximum use from his chain saw and will not be put to the time and expense of taking it to someone who can sharpen the teeth of the saw chain.

It is still another object of the invention to provide cutter teeth of this character having a hard surface layer on the top and on the outer side, with a softer core.

It is a further object of the invention to provide cutter teeth of this character having hard cutting edges.

It is a still further object of the invention to provide cutter teeth of this character wherein specific portions of the teeth are hard.

It is another object of the invention to provide teeth of this character wherein there is a gradual transition of hardness from the hard surface to the interior of the core.

It is a further object of the invention to provide cutter teeth of this character that have a relatively long useful life.

It is a still further object of the invention to provide cutter teeth of this character that are simple in construction.

It is a still further object of the invention to provide cutter teeth of this character that are relatively inexpensive to manufacture.

It is another object of the invention to provide cutter teeth of this character with controlled wearing-away characteristics.

The invention resides in the concept of a saw chain cutter link having a relatively flat vertical link body portion with a depth gauge adjacent one end and a cutter element extending upwardly of the link body rearwardly of the depth gauge, the cutter element comprising a longitudinally extending elongated cutter body having a rearwardly and downwardly profiled top surface and an outer side surface, the surfaces being connected together and being generally parallel to the cutting path, the leading end of the cutter body being downwardly and rearwardly inclined and beveled inwardly and rearwardly from the outer leading generally vertical edge, the top and outer side surfaces throughout their length having a hard case so that the hardened surfaces are substantially parallel with the direction of the cutting path, the cutter body inwardly of the hard case in both the top and outer side surfaces throughout their length comprising a core which is progressively softer than said hard case, the leading end of the cutter body being subjected to abrasion when cutting material, the leading end of the core abrading away faster than the hard case of the top surface and the outer side surface, so that the leading edge of the top surface and the leading edge of the outer side surface remain and function as relatively sharp cutting edges.

The characteristics and advantages of the invention are further sufficiently referred to in connection with the following detailed description of the accompanying drawings, which represent certain embodiments. After considering these examples skilled persons will understand that variations may be made without departing from the principles disclosed, and I contemplate the employment of any structures, arrangements, modes of operation, or steps of the method that are properly within the scope of the appended claims.

Referring more particularly to the drawings, which are for illustrative purposes only:

FIG. 1 is a side elevational view of a saw chain cutter link carrying a cutting element or cutter tooth;

FIG. 2 is a view taken on line 2—2 of FIG. 1;

FIG. 3 is a front end view of an alternative arrangement;

FIG. 4 is a top plan view of said alternative arrangement;

FIG. 5 is a sectional view taken on line 5—5 of FIG. 6 showing the cutter tooth of the present invention in operation on a piece of material;

FIG. 6 is an enlarged view taken on line 6—6 of FIG. 4.

Referring more particularly to FIGS. 1 and 2, there is shown a cutter link, indicated generally at 10, for a saw chain, said cutter link having a vertical body portion 12 which may be stamped from sheet metal or may be otherwise formed. Adjacent the ends of the vertical body 12 are rivet or pintel holes 14 to accommodate the rivets or pintels whereby the links of the chain are articulately connected together.

Adjacent the forward end of the link is a depth gauge 15 having a surface 16 for engagement with the bottom of the kerf in the usual well known manner.

Spaced rearwardly of the depth gauge 15 is the cutter element or cutter tooth, indicated generally at 18. The cutter tooth is connected to the body 12 by a part 19 which curves outwardly and upwardly from the body 12 and is integral therewith. The cutter link may be integrally formed or the tooth 18 may be a separate element welded or otherwise secured to the body of the link. The forward end of the cutter tooth body is inclined downwardly and rearwardly with the inner side beveled inwardly and rearwardly from the outer generally vertical leading shar cutting edge 18a, the top leading transverse edge 18b of the cutter body also being a sharp cutting edge.

In the embodiment shown in FIGS. 1 and 2, the tooth 18 has a hard top surface 20 and a hard side surface 22. From these surfaces there is a gradual transition of hardness to the interior or core of the tooth.

One method of securing this type of hardening of the tooth is by means of a carbonizing process. The teeth thus treated will have a wear pattern wherein the softer core material will abrade away as the cutter or teeth pass through the wood and come in contact with abrasive material while the hard portion or encasement 20 and 22 on the outer surfaces of the cutter tooth will maintain the cutting edge. In other words, the outer surfaces will not be abraded away as readily as the softer inner portion of the teeth. Therefore, as the saw chain passes through the wood the wear pattern is such that the soft material of the cutter teeth is abraded away and the hard case either wears away slowly or chips away, depending on the use to which the saw is put.

Where a hard surface or carburized process is used to harden a portion of the cutter tooth, the hard portion is the last bit of material worn or abraded away and serves to form a cutting edge. Actually the soft metal of the core is literally hollow ground away from the harder portion and the resulting action is that the hard facing or hard encasement on the cutter tooth remains as a cutting edge, the thickness depending upon the thickness of the hard facing itself. The wearing action literally sharpens the teeth as the soft material is the first part of the tooth to be worn away.

By proper control of the method or the process of treating the teeth and the use of various materials the above described progressive transition from the hard surface to the softer core is effected, and results in a wear pattern or profile worn on the face of the teeth, that is, a curve which extends from the hardened surface downwardly and inwardly into the cutter body itself leaving a sharp edge or cutting edge, as it is termed herein, which is more particularly shown and described in connection with the alternative arrangement of FIGS 3 to 6.

Still referring to FIG. 2, which not only has stippling for indicating the relative hardness of the tooth from the hard outer surfaces 20 and 22 inwardly, but also has lines A, B, C, D and E for reference purposes as an aid in bringing out the hardness characteristics of the tooth in various parts thereof. This is merely for purposes of illustration. By way of example, the top surface 20 and the side surface 22, outwardly of the line A, has a hardness of Rockwell 62–64, the thickness of this case hardness being in the neighborhood of ten thousandths (10/1000) of an inch. The rest of the material of the core has a diminishing hardness or gradual transitional hardness of core hardness of Rockwell C–48–50 at the core of the cutter.

Referring to the lines A, B, C, D and E, the hardness outwardly of the line A is 62–64, between lines A and B it is approximately 59–61, between B and C approximately 56–58, between lines C and D approximately 53–55 and between lines D and E approximately 50–52. This makes a gradual transition of approximately 12 points of hardness on the Rockwell C-Scale. In some cases it could actually amount to more.

Another method for supplying the hardness to the cutter is to induction harden the outer surface to a specified depth after the cutter body itself has been austempered to maintain a Rockwell scale of hardness of 40 or 50 on the cutter body. With this method an induction hardened case is formed on the outside surface of the cutter block.

Another method is to carburize the cutter, or, in the case of pieces that have already been austempered for core hardness, these parts are tumble carburized to obtain a specified hardness. This is accomplished by copper plating the cutter body completely and machining away the copper surfaces to be carburized, and then carburizing the exposed surfaces.

Austempering is a furnace heat treatment where the temperature of the cutters is elevated to a given value and then the cutters are quenched to the desired hardness.

In FIGS. 3 to 6 there is shown a cutter of the hooded type, that is, a flat stamping is shaped to form a figure 7 configuration with a horizontal part 40 arcuately rounded at 41 between the horizontal part 40 and an upwardly and outwardly inclined part 42, the lower end of part 42 merging into and being integral with the vertical body portion 43 of the link. This part of the link is similar to the vertical body portion 12 of FIGS. 1 and 2.

In this arrangement there is also a hard facing which may be formed by induction hardening, or any other suitable hardening means, so that there is a thin hard outer casement with the core or body of the cutter of less hardness, the transition of hardness inwardly of the core from the thin outer casement being a gradual transition, as in the arrangement of FIGS. 1 and 2.

This transitional hardness for the arrangement of FIGS. 3 to 6 is best shown in FIG. 6, wherein the hard case of the top surface is indicated at 40b and the hard case of the outer side surface is indicated at 40c.

The top part 40 of the cutter element has a generally transverse leading cutter edge 46 comprising the leading edge of the hard case thereof and the leading outer curved cutter edge 47 of the outer side surface is formed by the hard case of said side surface, the hardened leading edges 46 and 47 as well as the hardened layer being continuous.

The top horizontal part 40 has its leading end curved downwardly and rearwardly, as at 48 in FIG. 5. The leading end 52 of the side part 41 is inclined inwardly and rearwardly as shown in FIG. 4.

The surfaces 48 and 52 may be filed with a round file or other suitable means.

The operation of the present cutter element is illustrated in FIG. 5, wherein it is shown cutting a piece of material 56, said material being wood or the like.

The leading cutting edge is indicated at 46 and is shown cutting into the wood a predetermined depth. The part cut from the material 56 is shown at 58 and rubs against the surface 48 of the top cutter part. Since the core of the cutter element is softer than the hard surface 40b, the core will be abraded away much master than the leading edge 46 of the hard case of the top surface, so that the leading edge of the top surface will remain and function as a relatively sharp cutting edge which projects forwardly of the core.

The outer side surface is also harder than the core and with the cutting of material, the leading end of the core will also be abraded away faster than the hard case of the outer side surface, so that this leading edge of the hard case of the side part will remain and function as a relatively sharp cutting edge.

In summary, the principle or method by which the cutter is self-sharpened is the wearing away of the softer material of the core as the cutter is used in service, while the sharp cutting edge is maintained at the top and side surfaces by the thin hard case, as described above.

As the saw chain is being used the cutters pass through the wood, both abrasive and plain, so that there is a wearing away of the material of the cutters. By causing the cutters to wear in the above described manner, sharp cutting edges are maintained by the hard case while the softer material is worn away, to leave the free hard case edges as relatively sharp cutting edges.

It will be noted that in both of the above described arrangements the hard case surfaces are generally parallel to the operative path of movement indicated by the arrow "A" of FIG. 5.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and I do not wish to be restricted to the specific forms shown or methods described or uses mentioned except as defined in the accompanying claims, wherein various portions have been separated for clarity of reading and not for emphasis.

I claim:

1. A saw chain cutter link, comprising:
   (A) a relatively flat vertical link body portion;

(B) a depth gauge adjacent one end of said link and extending upwardly thereof;

(C) and a cutter element extending upwardly of said link body portion in rearwardly spaced relation to the depth gauge, said cutter element comprising a longitudinally extending elongated cutter body having a rearwardly and downwardly profiled top surface and a generally vertical outer side surface, said surfaces being adjoined, extending generally in the direction of the cutting path, the leading end of said cutter body being downwardly and rearwardly inclined from the top surface and beveled inwardly and rearwardly from the outer side surface so as to have leading top and side joining cutting edges, the top and outer side surfaces throughout their length being hardened so as to have a hard case, the hardened surfaces extending longitudinally substantially in the cutting direction, the cutter body inwardly of said hard case in both the top and outer side surfaces throughout their length comprising a core which is progressively softer inwardly from said hard case in substantially the same degree of variation throughout relative to both top and outer side surfaces from an outer predetermined maximum hardness to an inner predetermined minimum hardness, the leading end of said cutter body being subjected to abrasion when cutting material, the leading end of the core abrading away faster than the hard case of the top surface and the outer side surface, the abrasion occurring inwardly of the top and side surfaces progressively in amounts in accordance with the varied inwardly progressive softness of the core so that the leading end retains generally said inclined and beveled surfaces and so that the leading edge of said top surface and the leading edge of the outer side surface remain and function as relatively sharp cutting edges.

2. The invention defined by claim 1, wherein the top surface and outer side surface meet at an angle and so that progressively softer layers of the core intersect one another along a diagonal line extending inwardly from the apex of said angle.

3. The invention defined by claim 1, wherein the said cutter element and link have an approximate figure 7 configuration in front view cross section, said top surface being generally horizontal and said side surface being curved, extending outwardly of the link body portion and returning to join with said top surface.

4. A saw chain cutter link, comprising:

(A) a relatively flat vertical link body portion;

(B) a depth gauge adjacent one end of said link and extending upwardly thereof;

(C) and a cutter element extending upwardly of said link body portion in rearwardly spaced relation to the depth gauge, said cutter element comprising a longitudinally extending elongated cutter body having a rearwardly and downwardly profiled top surface and outer side surface meeting at an angle, the leading end of said cutter body being downwardly and rearwardly inclined from a top leading cutting edge and beveled inwardly and rearwardly from an outer leading generally vertical cutting edge, the cutting edges joining, the top and outer side surfaces throughout their length having a hard case, the cutter body inwardly of said hard case in both the top and outer side surfaces throughout their length comprising a core which is progressively softer than said hard case, the corresponding progressively softer layers intersecting one another along a diagonal line extending inwardly from the apex of said angle, the leading end of said cutter body being subjected to abrasion when cutting material, the leading end of the core abrading away faster than the hard case of the top surface and outer side surface so that the leading edges of said top side surface and the leading edge of the outer side surface remain and function as relatively sharp cutting edges.

5. A saw chain cutter link, comprising:

(A) a relatively flat vertical link body portion;

(B) and a cutter element extending upwardly of said link body portion adjacent the rear thereof, said cutter element comprising a longitudinally extending elongated cutter body having a rearwardly and downwardly profiled top surface and a generally vertical outer side surface, said surfaces being adjoined extending generally in the direction of the cutting path, the leading end of said cutter body being downwardly and rearwardly inclined from the top surface and beveled inwardly and rearwardly from the outer side surface so as to have leading top and side joining cutter edges, the top and outer side surfaces throughout their length being hardened so as to have a hard case, the hardened surfaces extending longitudinally substantially in the cutting direction, the cutter body inwardly of said hard case in both the top and outer side surfaces throughout their length comprising a core which is progressively softer inwardly from said hard case in substantially the same degree of variation throughout relative to both top and outer side surfaces from an outer predetermined maximum hardness to an inner predetermined minimum hardness, the leading end of said cutter body being subjected to abrasion when cutting material, the leading end of the core abrading away faster than the hard case of the top surface and the outer side surface, the abrasion occurring inwardly of the top and side surfaces progressively in amounts in accordance with the varied inwardly progressive softness of the core so that the leading end retains generally said inclined and beveled surfaces and so that the leading edge of said top surface and the leading edge of the outer side surface remain and function as relatively sharp cutting edges.

References Cited by the Examiner

UNITED STATES PATENTS

| | | | |
|---|---|---|---|
| 2,371,600 | 3/1945 | Bartholomew | 29—95 X |
| 2,974,695 | 3/1961 | Pfeffer | 143—133-2 |
| 3,023,490 | 3/1962 | Dawson | 143—133-2 |

DONALD R. SCHRAN, *Primary Examiner.*